United States Patent Office 2,846,450
Patented Aug. 5, 1958

2,846,450

PREPARATION OF MALEIC ANHYDRIDE

Herman S. Bloch, Skokie, Ill., assignor to Universal Oil Products Company, Des Plaines, Ill., a corporation of Delaware No Drawing. Application December 3, 1956
Serial No. 625,614

15 Claims. (Cl. 260—346.8)

This application is a continuation-in-part of my copending application Serial No. 367,741, filed July 13, 1953, now abandoned.

This invention relates to a process for preparing organic anhydrides and more particularly to a process for preparing maleic anhydride.

It is an object of this invention to provide a novel process for preparing organic anhydrides such as maleic anhydride utilizing an olefin as the starting material.

A further object of this invention is to provide a novel process for preparing organic anhydrides such as maleic anhydride by oxidizing olefinic hydrocarbons in the presence of a hydrogen halide and contacting the resultant halogenated product with steam.

One embodiment of the invention is found in a process for the preparation of maleic anhydride which comprises reacting 1 molecular proportion of an aliphatic olefinic hydrocarbon having the general formula:

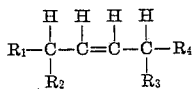

in which $R_1$, $R_2$, $R_3$ and $R_4$ are independently selected from the group consisting of hydrogen and alkyl radicals, with from about 3 molecular proportions to about 10 molecular proportions of oxygen and from about 2 molecular proportions to about 6 molecular proportions of hydrogen halide per molecular proportion of aliphatic olefinic hydrocarbon at a temperature in the range of from about 200° C. to about 600° C., reacting the resultant halogenated product with steam at a temperature in the range of from about 300° C. to about 600° C., and recovering the resultant maleic anhydride.

A specific embodiment of the invention resides in a process for the preparation of maleic anhydride which comprises reacting 1 molecular proportion of an aliphatic olefin hydrocarbon having the general formula:

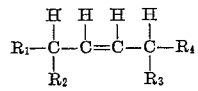

in which $R_1$, $R_2$, $R_3$ and $R_4$ are independently selected from the group consisting of hydrogen and alkyl radicals, with from about 3 molecular proportions to about 10 molecular proportions of oxygen and from about 2 molecular proportions to about 6 molecular proportions of hydrogen chloride per molecular proportion of said olefin in the presence of a mildly acidic metallic halide catalyst at a temperature in the range of from about 200° C. to about 600° C., reacting the resultant chlorinated product with steam at a temperature in the range of from about 300° C. to about 600° C., and recovering the resultant maleic anhydride.

A more specific embodiment of the invention is found in a process for the preparation of maleic anhydride which comprises reacting 1 molecular proportion of butene-2 with from about 3 molecular proportions to about 6 molecular proportions of oxygen and from about 2 molecular proportions to about 6 molecular proportions of hydrogen chloride per molecular proportion of said butene-2 in the presence of cupric chloride at a temperature in the range of from about 200° C., to about 600° C., reacting the resultant chlorinated product with steam in the presence of silica gel at a temperature in the range of from about 300° C. to about 600° C., and recovering the resultant maleic anhydride.

Other objects and embodiments referring to alternative olefins which may be used as starting materials and to alternative hydrogen halides and mildly acidic metallic halide catalysts which may be used will be referred to in the following further description of the invention.

Heretofore, maleic anhydride which finds a wide variety of uses such as use in alkyd resins for paints and varnishes; for polyester resins and vinyl copolymers; as a modifier for natural drying oils to improve the drying characteristics thereof; in agricultural chemicals (pesticides, plant hormones, soil conditioners); plasticizers; paper sizing; in organic syntheses (pharmaceuticals, adhesives, dye intermediates); etc., has been prepared by the catalytic oxidation of benzene or by the decomposition of monochloro- or monobromo-succinic acid. The present invention is now concerned with a novel process for preparing maleic anhydride using an aliphatic olefinic hydrocarbon as the starting material. Olefins falling within the above definition which may be used in this process have at least 4 carbon atoms, and their structure may be expressed by the general formula:

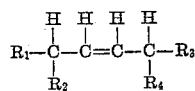

in which the R groups may consist of hydrogen or short alkyl groups, either straight or branched chain. Thus many different olefins may be used as long as they correspond in structure to 2-butenes containing not more than two alkyl substituents on each of the carbon atoms 1 and 4. Olefins which are utilizable in this reaction include butene-2, pentene-2, hexene-2, hexene-3, etc., heptene-2, heptene-3, etc., octene-2, octene-3, etc., 2-methyl-3-pentene, 2-ethyl-3-pentene, etc., 2,5-dimethyl-3-hexene, etc. Under certain conditions, diolefins may also be used in this process, however, the mono-olefins are the preferred starting materials. The preferred olefin which is used in this reaction is butene-2 due to the relatively low cost and ease of obtaining same, and also because the use of higher molecular weight olefins would necessitate more oxidation in order to obtain the desired product. Inasmuch as the higher molecular weight carboxylic and dicarboxylic acids are unstable under oxidation conditions, the formation of any of these anhydrides during the process will result in an autooxidation which will split off terminal carbon atoms until maleic anhydride is formed.

The olefin which is utilized as the feed stock is oxidized in the presence of an oxidizing agent such as oxygen, air, a mixture of oxygen and air or a mixture of oxygen and an inert gas, in the presence of a hydrogen halide such as hydrogen chloride, hydrogen bromide, or hydrogen iodide. Chlorine may also be used in the oxidation step, either alone or with oxygen-containing gases. The reaction may be carried out either with or without a catalyst, said catalyst being, for example, a mildly acidic metallic halide such as cupric chloride, ferric chloride, stannic chloride, cupric bromide, cupric iodide, ferric bromide, silver chloride, silver iodide, etc. It is also contemplated within the scope of this invention that the catalyst may also comprise a mixture of the aforesaid metallic halides or others.

The oxidation of the aliphatic olefinic hydrocarbon is carried out at elevated temperatures, said temperatures being in the range of from about 200° C. to about 600° C. or more, the preferred range being from about 300° C. to about 500° C. The oxidation reaction as hereinbefore described may result in the formation of at least 3 separate and distinct types of product depending upon the conditions chosen for the process. For example, in the presence of oxygen and hydrogen chloride, which is the preferred halogen compound, the following reactions involving the terminal methyl group of the aliphatic hydrocarbon may occur, the particular reaction I, II or III depending upon the operating conditions of temperature and pressure.

I 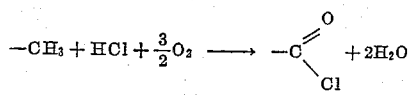

II 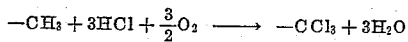

III 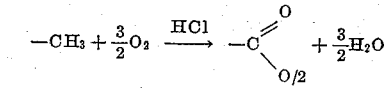

As is noted from the above equations, the particular reactants are present in varying ratios of hydrogen halide to olefin and oxygen to olefin. For example, since in the case of the simplest suitable olefin, butene-2, there are two terminal methyl groups subject to reactions I–III above, the hydrogen halide would be present in a ratio of from about 2 molecular proportions to about 6 molecular proportions of hydrogen halide per molecular proportion of aliphatic olefinic hydrocarbon. In addition, there should be present from about 3 molecular proportions to about 10 molecular proportions of oxygen per molecular proportion of olefin. As hereinbefore stated, the preferred olefinic hydrocarbons which are used in the process of the present invention comprise olefins having 4 or 5 carbon atoms per molecule. However, if longer chain aliphatic olefins are used there must be present at least 1½ molecular proportions more of oxygen for every additional carbon atom in the olefin, and preferably 3 molecular proportions of oxygen per molecular proportion of olefin for every additional carbon atom in the chain.

The aforementioned products of the reaction between an olefin and an oxidizing agent plus a hydrogen halide are then subjected to contact with steam at elevated temperatures ranging from about 300° C. to about 600° C. or more. The chlorinated products of reaction I and II are converted to maleic anhydride while the hydrogen chloride formed as a by-product may be regenerated for recycle purposes. This conversion is illustrated by the following equations:

IV 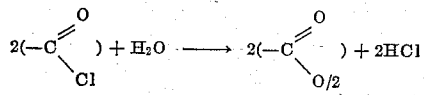

V 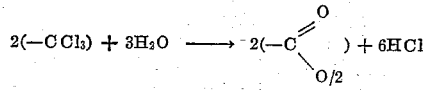

The reaction of the organic chloride and steam may be carried out, if so desired, in the presence of a contacting agent which provides a heat transfer surface. Generally, agents which are unreactive with the hydrogen chloride by-products will be used, said agents including alumina, activated charcoal, silica gel, clays, quartz chips, etc.

The process of the present invention may be carried out in any suitable manner and may be either a batch or continuous type operation. When a batch type operation is used, a quantity of the olefin, if in liquid form, which is used as the starting material is placed in a reaction vessel equipped with a mixing device along with gas introducing means. If so desired, the catalyst which may be used in the process is also placed in the reaction vessel along with the olefin. Alternatively, if the olefin is in gaseous form it is pressured into a vessel containing the desired catalyst. The reaction vessel is then heated to the desired temperature while the oxidizing agent such as oxygen, air, a mixture of oxygen and air, or a mixture of oxygen and an inert gas is introduced into the vessel through one of the gas inlets. At the same time the hydrogen halide, such as hydrogen chloride, is also admitted into the vessel through another gas introducing means. In an inert gas is included in the gas feed, means are provided for venting the spent gases and for scrubbing the valuable components from the vent gases. At the end of the reaction the contents thereof are transferred to a second vessel provided with means for introducing steam, or steam is introduced directly into the first vessel. The vessel is then heated to the desired temperature, namely, between about 300° C. and about 600° C. or more and the reactants subjected to the reaction of steam at this temperature. The second vessel, if one is used, may be provided with a contacting agent hereinbefore described, one example of such an agent being silica gel. At the end of the desired reaction time the reaction product is vented to a separator which is maintained at a temperature above 135° C. which is the decomposition temperature of maleic acid, and preferably at a temperature in the range of from about 150° C. to about 200° C. In this separator the maleic anhydride is stripped of steam and any hydrogen halide which has been formed during the reaction. The desired product, comprising maleic anhydride, is cooled and subjected to fractional distillation for further purification while any intermediate products and unconverted olefinic hydrocarbon feed may be recycled for further oxidation.

Another, and preferred, method of operation of the present process is of the continuous type. A particularly suitable type of operation comprises a fixed bed type in which the catalyst comprising a mildly acidic metallic halide or a mixture of several mildly acidic metallic halides is disposed as a bed in a reaction zone maintained at the proper operating conditions of temperature and pressure and the aliphatic olefinic hydrocarbon containing at least 4 carbon atoms is passed therethrough in either an upward or downward flow while being subjected to an influx of an oxidizing agent in the form of an oxygen containing gas and a hydrogen halide. The reaction product is led out of this first reaction zone and introduced into a second reaction zone also maintained at the proper operating conditions of temperature and pressure where the product undergoes contact with steam. The second reaction zone may be provided with a contacting agent of the type hereinbefore set forth such as silica gel, alumina, etc. The hydrogen halide which has been formed during the reaction of the organic halogen compound with steam is bled out of the second reaction vessel and recycled for use in the first reaction zone while the desired anhydride is continuously withdrawn and charged to a stripper where said anhydride is stripped of steam. The stripped anhydride is then cooled and subjected to conventional means for recovery thereof.

Another continuous type of process is the fluidized type of operation in which the olefin and the catalyst are maintained in a state of turbulence under hindered settling conditions in the first reaction zone while the olefin is being subjected to the action of the oxidizing agent and the hydrogen halide before being led into the second reaction zone and contact with steam to convert the organic halides to the anhydrides. Other continuous types of processes include the compact moving bed type of operation in which the catalyst and olefins pass either concurrently or countercurrently to each other. Still another type of continuous process is the slurry type process, in which the catalyst is carried into the reaction zone as a slurry in the liquid olefinic starting material. In each of the aforementioned types of processes the unreacted olefins may be separated out and recycled for use as a portion of the feed material while the desired product is withdrawn for introduction into the second reaction zone. Best ultimate yields of maleic anhydride are usually obtained at relatively low conversions per pass, of the order of 15 to about 40 percent, and preferably from about 20 to about 35 percent.

In the present process, maleic acid or fumaric acid may be formed as reaction products in addition to or instead of maleic anhydride, depending upon the particular conditions employed within the ranges specified and upon the particular recovery methods chosen. Since the three materials are mutually interconvertible under well recognized conditions, however, the term "maleic anhydride" is used in these specifications and claims as a convenient term to designate any of the three materials or any mixture thereof.

The following examples are given to illustrate the process of the invention which, however, are not intended to limit the generally broad scope of the present invention in strict accordance therewith.

*Example I*

A catalyst comprising 14 g. of finely divided cupric chloride is placed in a Monel reaction vessel of 3 liter volume provided with stirring means and gas introducing inlets. The vessel is sealed and 56 g. of butent-2 pressured in, meanwhile heating said vessel. While the heating is carried on, oxygen in the form of air diluted with nitrogen to an oxygen content of 5% is slowly introduced into the vessel through one of the gas inlets while 90 g. of hydrogen chloride is introduced through another inlet until a total pressure of 1500 p. s. i. is reached. The heating is continued until a temperature of approximately 350° C. is reached, pure oxygen being meanwhile bled in slowly until a final pressure of 1800 p. s. i. is reached, corresponding to the addition of a total of approximately 130 g. of oxygen. The vessel is then maintained at this temperature for a further period of approximately 15 minutes, at the end of which time the vessel is cooled to approximately 0° C., the pressure is vented, 100 g. of water is added, and the vessel is again heated until a temperature of approximately 450° C. is reached. The reaction mixture is subjected to the action of steam at this temperature for a period of one hour. At the end of this time the reaction products are bled off to a separator in which the temperature is maintained at about 200° C. and wherein steam is stripped from the maleic anhydride. The maleic anhydride is withdrawn from the separator, cooled to room temperature and subjected to fractional distillation to remove any side reaction products which may be present, the cut boiling at 201–204° C., comprising 31 g. of maleic anhydride, being separated therefrom.

*Example II*

70 g. of pentene-2 is passed over 100 g. of a catalyst comprising a mixture of 10% cupric chloride and 10% ferric chloride disposed on a granular alumina support and placed in a reaction vessel comprising a heated vertical Monel tube. The vessel is heated to a temperature of approximately 450° C. and the flow rate of the pentene-2 is adjusted so as to give a residence time in the catalyst area of approximately 30 minutes. A stream of nitrogen-diluted air (3% oxygen) is introduced into the reactor through one of the gas inlets and a stream of hydrogen halide, comprising in this instance, hydrogen bromide is also passed into said second reactor tube through a second inlet, the mol ratio of oxygen to pentene being 4 and of hydrogen bromide to pentene being 2. The effluent products are passed directly through a second tubular reactor packed with granular silica gel, said reactor being heated to a temperature of approximately 450° C. A stream of steam is passed through the second tubular reactor simultaneously with effluent products, the residence time of said product in said second reactor being approximately 1 hour. The reaction products of the second reactor are continuously withdrawn and passed through a separator maintained at a temperature of about 150° C. where the gases are separated, the steam and hydrogen bromide formed as a by-product in the conversion of the organic bromide being separated for recycle as a portion of the hydrogen bromide used in the first reaction, while the maleic anhydride is recovered, cooled and subjected to fractional distillation to purify the same. The cut boiling in the range of from about 201–204° C., comprising 38 g. of maleic anhydride, is separated therefrom.

I claim as my invention:

1. A process for the preparation of maleic anhydride which comprises reacting one molecular proportion of an aliphatic olefinic hydrocarbon having the general formula:

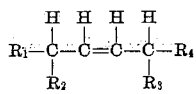

in which $R_1$, $R_2$, $R_3$ and $R_4$ are independently selected from the group consisting of hydrogen and short alkyl radicals, with from about 3 to about 10 molecular proportions of oxygen and from about 2 molecular proportions to about 6 molecular proportions of hydrogen halide selected from the group consisting of hydrogen chloride, hydrogen bromide and hydrogen iodide per molecular proportion of aliphatic olefinic hydrocarbon at a temperature of from about 200° C. to about 600° C., reacting the resultant halogenated product with steam at a temperature in the range of from about 300° C. to about 600° C., and recovering the resultant maleic anhydride.

2. A process for the preparation of maleic anhydride which comprises reacting one molecular proportion of butene-2 with from about 3 to about 6 molecular proportions of oxygen and from about 2 molecular proportions to about 6 molecular proportions of hydrogen halide selected from the group consisting of hydrogen chloride, hydrogen bromide and hydrogen iodide per molecular proportion of butene-2 at a temperature of from about 200° C. to about 600° C., reacting the resultant halogenated product with steam at a temperature in the range of from 300° C. to about 600° C., and recovering the resultant maleic anhydride.

3. A process for the preparation of maleic anhydride which comprises reacting one molecular proportion of pentene-2 with from about 5 to about 10 molecular proportions of oxygen and from about 2 molecular proportions to about 6 molecular proportions of hydrogen halide selected from the group consisting of hydrogen chloride, hydrogen bromide and hydrogen iodide per molecular proportion of pentene-2 at a temperature of from about 200° C. to about 600° C., reacting the resultant halogenated product with steam at a temperature in the range of from about 300° C. to about 600° C., and recovering the resultant maleic.

4. A process for the preparation of maleic anhydride which comprises reacting one molecular proportion of butene-2 with from about 3 to about 6 molecular proportions of oxygen and from about 2 molecular proportions to about 6 molecular proportions of hydrogen chloride per molecular proportion of butene-2 at a temperature of from about 200° C. to about 600° C., reacting the resultant chlorinated product with steam at a temperature in the range of from about 300° C. to about 600° C., and recovering the resultant maleic anhydride.

5. A process for a preparation of maleic anhydride which comprises reacting one molecular proportion of pentene-2 with from about 5 to about 10 molecular proportions of oxygen and from about 2 molecular proportions to about 6 molecular proportions of hydrogen chloride per molecular proportion of pentene-2 at a temperature of from about 200° C. to about 600° C., reacting the resultant chlorinated product with steam at a temperature in the range of from about 300° C. to about 600° C., and recovering the resultant maleic anhydride.

6. A process for the preparation of maleic anhydride which comprises reacting one molecular proportion of an aliphatic olefinic hydrocarbon having the general formula:

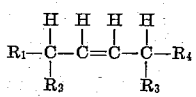

in which $R_1$, $R_2$, $R_3$ and $R_4$ are independently selected from the group consisting of hydrogen and short alkyl radicals, with from about 3 molecular proportions to about 10 molecular proportions of oxgen and from about 2 molecular proportions to about 6 molecular proportions of hydrogen halide selected from the group consisting of hydrogen chloride, hydrogen bromide and hydrogen iodide per molecular proportion of said olefin in the presence of at least one metallic halide catalyst selected from the group consisting of cupric chloride, ferric chloride, stannic chloride, cupric bromide, cupric iodide, ferric bromide, silver chloride and silver iodide at a temperature in the range of from about 200° C. to about 600° C., reacting the resultant halogenated product with steam at a temperature in the range of from about 300° C. to about 600° C., and recovering the resultant maleic anhydride.

7. A process for the preparation of maleic anhydride which comprises reacting one molecular proportion of an aliphatic olefinic hydrocarbon having the general formula:

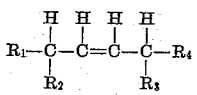

in which $R_1$, $R_2$, $R_3$ and $R_4$ are independently selected from the group consisting of hydrogen and short alkyl radicals, with from about 3 molecular proportions to about 10 molecular proportions of oxygen and from about 2 molecular proportions to about 6 molecular proportions of hydrogen halide selected from the group consisting of hydrogen chloride, hydrogen bromide and hydrogen iodide per molecular proportion of said olefin in the presence of cupric chloride at a temperature in the range of from about 200° C. to about 600° C., reacting the resultant halogenated product with steam at a temperature in the range of from about 300° C. to about 600° C., and recovering the resultant maleic anhydride.

8. A process for the preparation of maleic anhydride which comprises reacting one molecular proportion of butene-2 with from about 3 molecular proportions to about 6 molecular proportions of oxygen and from about 2 molecular proportions to about 6 molecular proportions of hydrogen chloride per molecular proportion of said olefin in the presence of cupric chloride at a temperature in the range of from about 200° C. to about 600° C., reacting the resultant chlorinated product with steam at a temperature in the range of from about 300° C. to about 600° C., and recovering the resultant maleic anhydride.

9. A process for the preparation of maleic anhydride which comprises reacting one molecular proportion of butene-2 with from about 3 molecular proportions to about 6 molecular proportions of oxygen and from about 2 molecular proportions to about 6 molecular proportions of hydrogen bromide per molecular proportion of said olefin in the presence of ferric chloride at a temperature in the range of from about 200° C. to about 600° C., reacting the resultant brominated product with steam at a temperature in the range of from about 300° C. to about 600° C., and recovering the resultant maleic hyhydride.

10. A process for the preparation of maleic anhydride which comprises reacting one molecular proportion of pentene-2 with from about 5 molecular proportions to about 10 molecular proportions of oxygen and from about 2 molecular proportions to about 6 molecular proportions of hydrogen chloride per molecular proportion of said olefin in the presence of cupric chloride at a temperature in the range of from about 200° C. to about 600° C., reacting the resultant chlorinated product with steam at a temperature in the range of from about 300° C. to about 600° C., and recovering the resultant maleic anhydride.

11. A process for the preparation of maleic anhydride which comprises reacting one molecular proportion of pentene-2 with from about 5 molecular proportions to about 10 molecular proportions of oxygen and from about 2 molecular proportions to about 6 molecular proportions of hydrogen bromide per molecular proportion of said olefin in the presence of ferric chloride at a temperature in the range of from about 200° C. to about 600° C., reacting the resultant brominated product with steam at a temperature in the range of from about 300° C. to about 600° C., and recovering the resultant maleic anhydride.

12. A process for the preparation of maleic anhydride which comprises reacting one molecular proportion of an aliphatic olefinic hydrocarbon having the general formula:

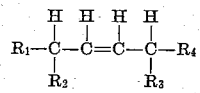

in which $R_1$, $R_2$, $R_3$ and $R_4$ are independently selected from the group consisting of hydrogen and short alkyl radicals, with from about 3 molecular proportions to about 10 molecular proportions of oxygen and from about 2 molecular proportions to about 6 molecular proportions of hydrogen halide selected from the group consisting of hydrogen chloride, hydrogen bromide and hydrogen iodide per molecular proportion of said olefin in the presence of cupric chloride at a temperature in the range of from about 200° C. to about 600° C., reacting the resultant halogenated product with steam in the presence of silica gel at a temperature in the range of from about 300° C. to about 600° C., and recovering the resultant maleic anhydride.

13. A process for the preparation of maleic anhydride which comprises reacting one molecular proportion of butene-2 with from about 3 molecular proportions to about 10 molecular proportions of oxygen and from about 2 molecular proportions to about 6 molecular proportions of hydrogen halide selected from the group consisting of hydrogen chloride, hydrogen bromide and hydrogen iodide per molecular proportion of said olefin in the presence of cupric chloride at a temperature in the range of from about 200° C. to about 600° C., reacting the resultant halogenated product with steam in the presence of silica gel at a temperature in the range of from about 300° C. to about 600° C., and recovering the resultant maleic anhydride.

14. A process for the preparation of maleic anhydride which comprises reacting one molecular proportion of pentene-2 with from about 3 molecular proportions to about 10 molecular proportions of oxygen and from about 2 molecular proportions to about 6 molecular proportions of hydrogen chloride per mclecular proportion of said olefin in the presence of cupric chloride at a temperature in the range of from about 200° C. to about 600° C., reacting the resultant chlorinated product with steam in the presence of silica gel at a temperature in the range of from about 300° C. to about 600° C., and recovering the resultant maleic anhydride.

15. A process for the preparation of maleic anhydride which comprises reacting one molecular proportion of butene-2 with from about 3 molecular proportions to about 6 molecular proportions of oxygen and from about 2 molecular proportions to about 6 molecular proportions of hydrogen chloride per molecular proportion of said olefin in the presence of cupric chloride at a temperature in the range of from about 200° C. to about 600° C., reacting the resultant chlorinated product with steam in the presence of silica gel at a temperature in the range of from about 300° C. to about 600° C., and recovering the resultant maleic anhydride.

References Cited in the file of this patent

UNITED STATES PATENTS

| | | |
|---|---|---|
| 2,097,904 | Walters | Nov. 2, 1937 |
| 2,103,692 | Piotrowski | Dec. 28, 1937 |
| 2,260,409 | Slotterbeck | Oct. 28, 1941 |
| 2,369,182 | Rust | Feb. 13, 1945 |